United States Patent
Fuse et al.

(10) Patent No.: US 10,489,027 B2
(45) Date of Patent: Nov. 26, 2019

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Toru Fuse, Yokohama (JP); Masako Kitazaki, Yokohama (JP); Kimitake Hasuike, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 373 days.

(21) Appl. No.: 14/958,560

(22) Filed: Dec. 3, 2015

(65) Prior Publication Data
US 2016/0092079 A1 Mar. 31, 2016

Related U.S. Application Data

(63) Continuation of application No. PCT/JP2014/064930, filed on Jun. 5, 2014.

(30) Foreign Application Priority Data

Oct. 31, 2013 (JP) .................... 2013-226304

(51) Int. Cl.
*G06F 3/0484* (2013.01)
*G06F 3/0482* (2013.01)
*G06F 16/9032* (2019.01)

(52) U.S. Cl.
CPC ........ *G06F 3/04842* (2013.01); *G06F 3/0482* (2013.01); *G06F 3/04847* (2013.01); *G06F 16/9032* (2019.01)

(58) Field of Classification Search
CPC ............... G06F 17/30; G06F 17/30554; G06F 17/30572; G06F 17/30651;
(Continued)

(56) References Cited

U.S. PATENT DOCUMENTS

| 6,473,751 B1 | 10/2002 | Nikolovska et al. |
| 7,516,419 B2 * | 4/2009 | Petro ..................... G06F 3/0482 345/184 |

(Continued)

FOREIGN PATENT DOCUMENTS

| CN | 101167073 A | 4/2008 |
| EP | 1466242 A2 | 10/2004 |

(Continued)

OTHER PUBLICATIONS

GeekedAtBirth. "Dynamic Resizing of Tooltip to Match Content?" Dynamic Resizing of Tooltip to Match Content?, Unity, Nov. 13, 2011, answers.unity.com/questions/31430/dynamic-resizing-of-tooltip-to-match-content.html. (Year: 2011).*

(Continued)

*Primary Examiner* — Jennifer N To
*Assistant Examiner* — Liang Y Li
(74) *Attorney, Agent, or Firm* — Oliff PLC

(57) ABSTRACT

An information processing apparatus includes a selection unit that displays a drawing indicating a search word or an attribute of the search word on a trajectory at one corner of four corners of a screen in a selectable state, moves the drawing along the trajectory in response to an operation of a user, and selects the drawing to select the search word with the attribute attached thereto or the attribute of the search word, and a search unit that performs a search using the search word or the attribute of the search word that is selected by the selection unit, wherein the selection unit displays a plurality of trajectories, each of which an attribute is associated with and the drawing is arranged on.

8 Claims, 12 Drawing Sheets

(58) Field of Classification Search
CPC ......... G06F 17/30696; G06F 17/30716; G06F 17/30719; G06F 17/30941; G06F 17/30958; G06F 17/30961; G06F 17/30973; G06F 17/30991; G06F 17/30994; G06F 3/04842; G06F 3/04847; G06F 3/0488

See application file for complete search history.

(56) References Cited

U.S. PATENT DOCUMENTS

| | | | |
|---|---|---|---|
| 7,898,529 | B2 | 3/2011 | Fitzmaurice et al. |
| 8,584,051 | B1* | 11/2013 | Alfaro .................. H04L 67/306 715/752 |
| 9,710,471 | B2* | 7/2017 | Yang ................. G06F 17/30038 |
| 2003/0128192 | A1 | 7/2003 | van Os |
| 2005/0140661 | A1* | 6/2005 | Collins ................. G06F 3/0482 345/173 |
| 2005/0183012 | A1 | 8/2005 | Petro et al. |
| 2006/0069997 | A1 | 3/2006 | Hsieh et al. |
| 2006/0242121 | A1 | 10/2006 | DeVorchik et al. |
| 2006/0282464 | A1 | 12/2006 | Morris |
| 2007/0136690 | A1 | 6/2007 | MacLaurin et al. |
| 2008/0215240 | A1* | 9/2008 | Howard ................. G01C 21/36 701/469 |
| 2009/0037813 | A1 | 2/2009 | Newman et al. |
| 2010/0077334 | A1 | 3/2010 | Yang et al. |
| 2011/0035380 | A1 | 2/2011 | Stafford |
| 2011/0066980 | A1* | 3/2011 | Chmielewski ........ G06F 3/0482 715/834 |
| 2011/0202838 | A1* | 8/2011 | Han ...................... G06F 3/0346 715/702 |
| 2012/0079427 | A1* | 3/2012 | Carmichael ......... G06F 3/04817 715/825 |
| 2012/0167143 | A1 | 6/2012 | Longet et al. |
| 2012/0215404 | A1 | 8/2012 | Sugiyama et al. |
| 2014/0325446 | A1 | 10/2014 | Gojyo et al. |
| 2015/0058769 | A1* | 2/2015 | Kim ........................ G06F 9/451 715/765 |

FOREIGN PATENT DOCUMENTS

| | | |
|---|---|---|
| EP | 1536315 A1 | 6/2005 |
| JP | H01-112446 A | 5/1989 |
| JP | H08-171562 A | 7/1996 |
| JP | H11-012446 A | 1/1999 |
| JP | 2005-339393 A | 12/2005 |
| JP | 2006031115 A | 2/2006 |
| JP | 2007026032 A | 2/2007 |
| JP | 2007-109181 A | 4/2007 |
| JP | 2009-076097 A | 4/2009 |
| JP | 4441685 B2 | 3/2010 |
| JP | 2011-107783 A | 6/2011 |
| JP | 2011-180990 A | 9/2011 |
| JP | 4953612 B2 | 6/2012 |
| JP | 2012128652 A | 7/2012 |
| JP | 2012-190440 A | 10/2012 |
| JP | 5111743 B2 | 1/2013 |
| WO | 03/062978 A2 | 7/2003 |
| WO | 2013-080448 A1 | 6/2013 |

OTHER PUBLICATIONS

Feb. 16, 2017 Office Action issued in Australian Patent Application No. 2014341659.
Apr. 4, 2017 Office Action issued in Japanese Patent Application No. 2013-226304.
Jun. 14, 2017 extended Search Report issued in European Patent Application No. 14858497.2.
Dec. 22, 2016 Office Action issued in Japanese Patent Application No. 2013-226304.
Aug. 9, 2016 Office Action issued in Japanese Patent Application No. 2013-226304.
Sep. 2, 2014 Written Opinion issued in International Patent Application No. PCT/JP2014/064930.
Sep. 2, 2014 International Search Report Iussed in Patent Application No. PCT/JP2014/064930.
Apr. 4, 2018 Office Action issued in Chinese Patent Application No. 20148003278.1.
Jun. 19, 2018 Office Action issued in European Patent Application No. 14858497.2.

* cited by examiner

| | RANGE 1020 | |
|---|---|---|
| 1010 | WIDE 1022 | NARROW 1024 |
| CONTENT HISTORY, AND VERSION | ENLARGING RANGE OF HISTORY | REDUCING RANGE OF HISTORY |
| REFERENCE DOCUMENT IN CONTENT PRODUCTION | ENLARGING RANGE OF REFERENCE PERIOD | REDUCING RANGE OF REFERENCE PERIOD |
| REFERENCE DOCUMENT IN CONTENT VIEWING | ENLARGING RANGE OF REFERENCE PERIOD | REDUCING RANGE OF REFERENCE PERIOD |

1000

(a)        (b)

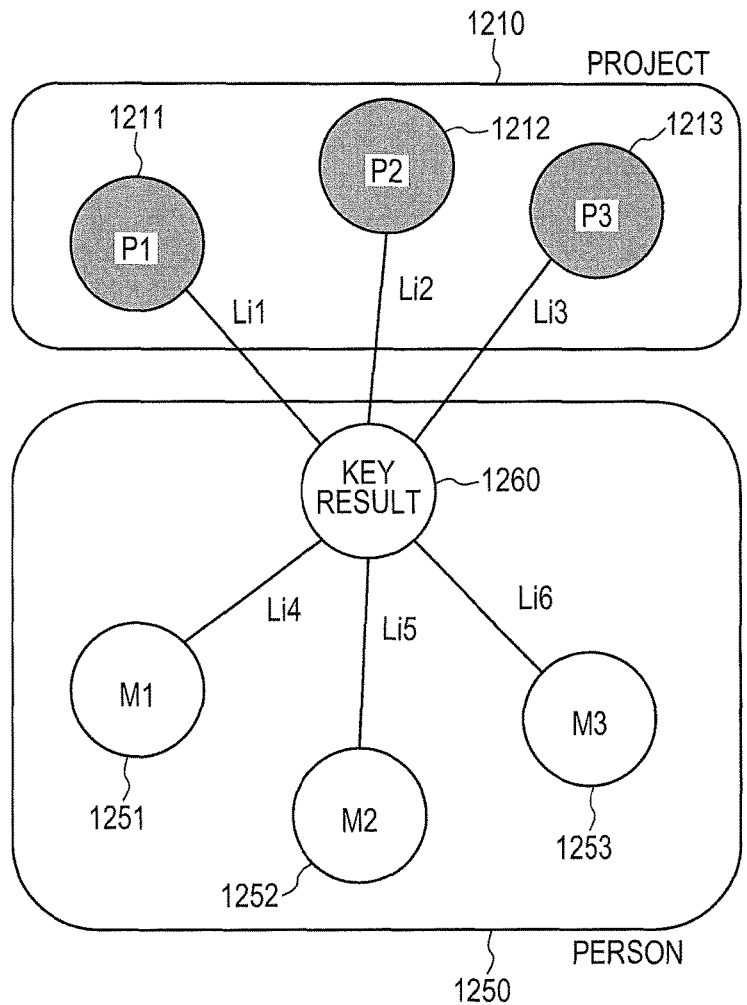

FIG. 14

| | 1410 | 1420 | 1430 | 1440 | 1450 | 1460 |
|---|---|---|---|---|---|---|
| | | PERSON | PERSON 75% PROJECT 25% | CENTER | PERSON 25% PROJECT 75% | PROJECT |
| PERSON | | 100% | 75% | 50% | 25% | 0% |
| PROJECT | | 0% | 25% | 50% | 75% | 100% |
| | | LOCATION OF RANGE C | | LOCATION OF RANGE B | | LOCATION OF RANGE A |

1400

INFORMATION PROCESSING APPARATUS AND NON-TRANSITORY COMPUTER READABLE MEDIUM

CROSS REFERENCE TO RELATED APPLICATION

This is a continuation of International Application No. PCT/JP2014/064930 filed on Jun. 5, 2014, and claims priority from Japanese Patent Application No. 2013-226304, filed on Oct. 31, 2013.

BACKGROUND

Technical Field

The present invention relates to an information processing apparatus and a non-transitory computer readable medium.

SUMMARY

An aspect of the present invention provides an information processing apparatus including a selection unit that displays a drawing indicating a search word or an attribute of the search word on a trajectory at a corner of four corners of a screen in a selectable state, moves the drawing along the trajectory in response to an operation of a user, and selects the drawing to select the search word with the attribute attached thereto or the attribute of the search word, and a search unit that performs a search using the search word or the attribute of the search word that is selected by the selection unit, wherein the selection unit displays a plurality of trajectories, each of which an attribute is associated with and the drawing is arranged on.

BRIEF DESCRIPTION OF THE DRAWINGS

Exemplary embodiment(s) of the present invention will be described in detail based on the following figures, wherein:

FIG. 12 illustrates an example of an ontology graph serving as a process target in accordance with the embodiment;

FIG. 13 illustrates a data structure example of a project-person range table;

FIG. 14 illustrates a data structure example of a person-project range table;

DETAILED DESCRIPTION

An exemplary embodiment of the present invention is described with reference to the drawings.

Figure 1:
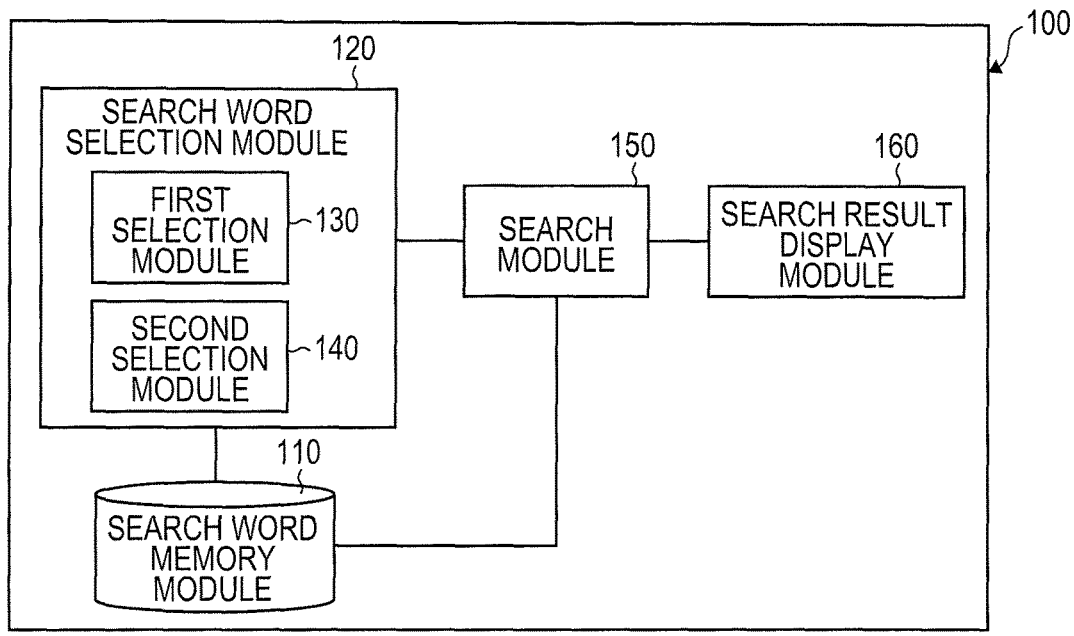
FIG. 1 is a modular configuration diagram of an embodiment.

FIG. 1 is a conceptual modular configuration diagram of the embodiment.

The term "module" refers to a software component that is logically separable (a computer program), or a hardware component. The module of the embodiment refers to not only a module in the computer program but also a module in a hardware configuration. The discussion of the embodiment also serves as the discussion of computer programs for causing the modules to function (including a program that causes a computer to execute each step, a program that causes the computer to function as means, and a program that causes the computer to implement each function), and as the discussion of a system and a method. For convenience of explanation, the phrases "stores information," "causes information to be stored," and other phrases equivalent thereto are used. If the embodiment is a computer program, these phrases are intended to express "causes a memory device to store information" or "controls a memory device to cause the memory device to store information." The modules may correspond to the functions in a one-to-one correspondence. In a software implementation, one module may form one program or multiple modules may form one program. One module may form multiple programs. Multiple modules may be executed by a single computer. A single module may be executed by multiple computers in a distributed environment or a parallel environment. One module may include another module. In the discussion that follows, the term "connection" refers to not only a physical connection but also a logical connection (such as an exchange of data, instructions, and data reference relationship). The term "predetermined" means that something is decided in advance of a process of interest. The term "predetermined" is thus intended to refer to something that is decided in advance of a process of interest in the embodiment. Even after a process in the embodiment has started, the term "predetermined" refers to something that is decided in advance of a process of interest depending on a condition or a status of the embodiment at the present point of time or depending on a condition or status heretofore continuing down to the present point of time. If "predetermined values" are plural, the predetermined values may be different from each other, or two or more of the predetermined values (including all the values) may be equal to each other. A statement that "if A, B is to be performed" is intended to mean "that it is determined whether something is A, and that if something is determined as A, an action B is to be carried out". The statement becomes meaningless if the determination as to whether something is A is not performed.

The term "system" and the term "apparatus" refer to an arrangement where multiple computers, hardware configurations, and apparatuses are interconnected via a communication network (including a one-to-one communication connection). The term "system" and the term "apparatus" also refer to an arrangement that includes a single computer, a hardware configuration, and an apparatus. The term "system" and the term "apparatus" have the same definition and are interchangeable with each other. The system does not include a social system that is a social "arrangement" formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate. The memory devices may include a hard disk, a random-access memory (RAM), an external storage medium, a memory device connected via a communication network, and a register within a CPU (Central Processing Unit).

An information processing apparatus 100 of the embodiment performs a search using a search word or an attribute of the search word. As illustrated in FIG. 1, the information processing apparatus 100 includes a search word memory module 110, search word selection module 120, a search module 150, and a search result display module 160. The information processing apparatus 100 is typically implemented by a tablet personal computer, and a touchpanel of the tablet personal computer is operated using a finger, a pen or the like.

The search word memory module 110 is connected to the search word selection module 120, and the search module 150. The search word memory module 110 stores a search word having an attribute attached thereto, and a document or the like, which finally serves as a search target associated with the search word. The document is digital data, such as text data, an image, a moving image, or audio, or a combination thereof. The document serves as a target of search, edit, and storage, and may be exchanged as an individual unit among systems or users, or anything similar to the document. More specifically, the document includes a document and a Web page, created in accordance with a document generating program.

Figure 17:
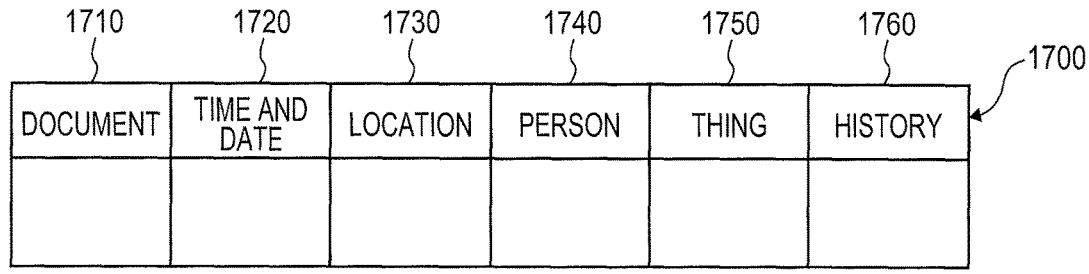
FIG. 17 illustrates a data structure example of a search target table.

The search words are classified according to the standpoint of time (the day before yester, yesterday, today, or the like), place, person, or event (job, project, event, or the like), or history (data printed, written, created, received, or the like). These attributes are attached to each search word. Each search word may include one of these attributes and does not necessarily have to include all these attributes. The search word memory module 110 stores a search target table 1700, for example. FIG. 17 illustrates a data structure example of the search target table 1700. The search target table 1700 includes a document column 1710, a time and date column 1720, a location column 1730, a person column 1740, a thing column 1750, and a history column 1760. The document column 1710 stores a document. Information to be stored on the document column 1710 may be a document itself, a location where the document is stored (such as URI, URL, or the like), or a word appearing in the document. The time and date column 1720 stores time and date (year, month, day, hours, minutes, seconds, and unit time shorter than a second, or a combination of these units, or a word indicating time and date). The location column 1730 stores a location (GPS output information indicating latitude and longitude, geographical name, building name, or the like). The person column 1740 stores the name of a person. The thing column 1750 stores a thing. The history column 1760 stores a history. For example, the time and date column 1720 stores yesterday, the day before yesterday, today, or the like. The thing column 1750 stores a job, a project, or an event. The history column 1760 stores data printed, written, created, or received, for example. Naturally, classification of the search words (attaching attributes to search words) are performed in advance, and the search target table 1700 is prepared in advance.

The search word memory module 110 does not necessarily have to be included in the information processing apparatus 100, but may be a database or the like arranged in another information processing apparatus connected to the information processing apparatus 100 for communications.

The search word selection module 120 is connected to the search word memory module 110, and the search module 150, and include a first selection module 130, and a second selection module 140. The first selection module 130 has a function of identifying a search target (referred to as a lens function), and the second selection module 140 has a function of narrowing the search targets (referred to as a narrowing function).

The first selection module 130 displays drawings indicating search words or attributes of the search words, on a trajectory at one of the four corners (four apexes and angles) of a screen in a selectable state. The first selection module 130 moves the drawing along the trajectory and selects the drawing in response to an operation of a user. The first selection module 130 thus selects the search word having the attribute attached thereto or the attribute of the search word. The selection includes not only expressly selecting a drawing by operation of a user's finger (the user's finger touching the drawing). Also, if a drawing is stopped on the trajectory at a predetermined location (for example, at a central location along the displayed trajectory), that drawing may be regarded as being selected.

The "drawings" includes, for example, a circle, a rectangle, and a triangle (a lens-shaped circle is mainly illustrated below). More specifically, the drawing is a sub-lens 212 to be discussed below in FIG. 2. Each drawing is associated with a search word or an attribute of the search word. The selection of a drawing is interpreted to mean that the search word associated with the drawing or the attribute of the search word is selected.

The "one of the four corners of the screen" is intended to mean at least one of the four corners (the top left, the top right, the bottom right and the bottom left corners) of the screen (such as a touchpanel) of the information processing apparatus 100. A drawing for search may be displayed at each of the four corners (apexes).

Figure 2:
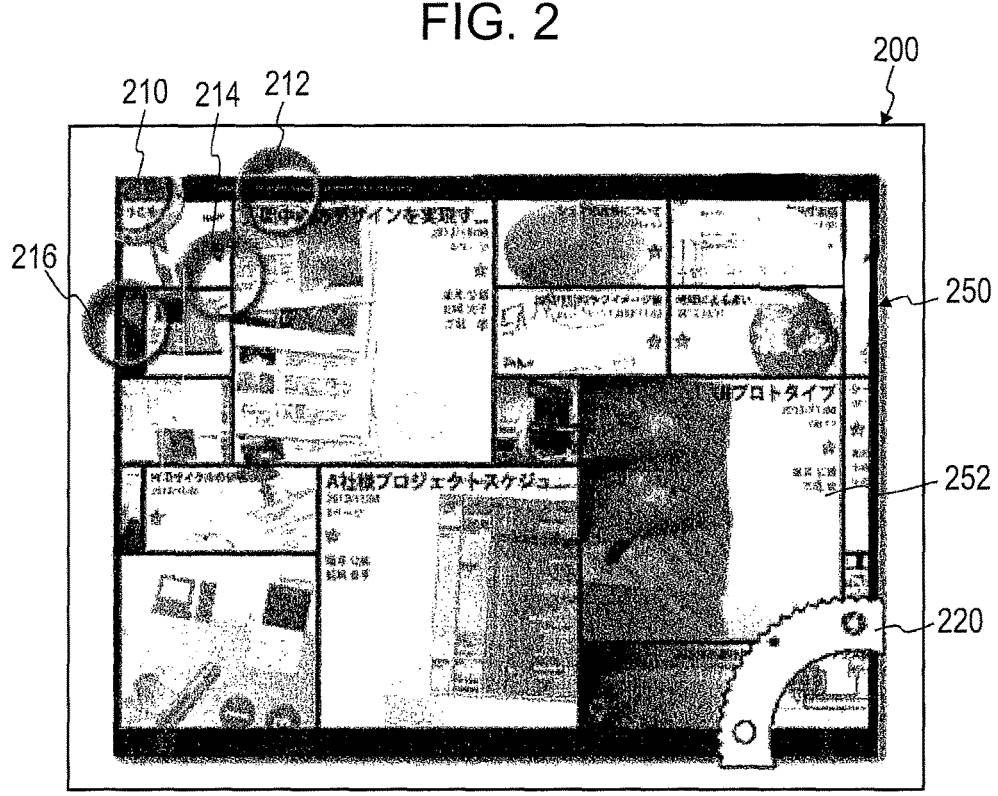
FIG. 2 illustrates a display example on a screen in the embodiment.

The shape of the "trajectory" may be of any shape that is a closed loop along which a moving point returns to an original location after a round-the-loop travel. For example, a portion of a displayed trajectory may be an elliptic arc (including a circular arc). A portion of an ellipse that falls within a screen is a predetermined percentage or more of the entire ellipse. The predetermined percentage may be ¼, for example. If the trajectory is a circular arc, the arc may be centered on the corner of the screen or in the vicinity of each of the corners of the screen. The trajectory of the elliptical arc may or may not be visible on the screen. More specifically, a sub-lens 212, a sub-lens 214, and a sub-lens 216 are arranged along the trajectory as illustrated in FIG. 2.

The phrase "in response to the operation of the user" is intended to mean an operation performed by the user to move or select the drawing using his or her finger, a pen, or the like.

There may be multiple trajectories at the corner of the screen, and the drawing may be movable along each trajectory. The first selection module 130 may select multiple search words or multiple attributes of the multiple search words by combining multiple drawings arranged at each trajectory. For example, the multiple trajectories may be multiple concentric circles different in diameter. The "combination of drawings" may be multiple drawings lined along a straight line. The drawings lined along a line connecting the center of the screen and one corner of the screen may be treated as a combination of search words. The combination of drawings is described more below referring to FIG. 7.

When drawings are displayed, the first selection module 130 may display a drawing as an operation target of the user, from among the multiple trajectories, in a form different from the other drawings. The "drawing as the operation target" is intended to mean a drawing in a selected state. The "other drawings" are intended to mean ordinary drawings that are not selected. The "form" includes a shape, a pattern, a color, or a combination of these elements, or a dynamically changing one of these elements (such as a flash, or an animation). The "form different from the other drawings" includes, for example, thickening the outline of a drawing, expanding a drawing, modifying the color tone of a drawing, modifying the color tone of a drawing other than a specified drawing, or making the drawing other than the specified drawing translucent. A more specific example about this process is described with reference to FIG. 7.

The first selection module 130 may associate attributes with trajectories, and display multiple trajectories. The first selection module 130 organizes a trajectory on a per attribute basis, and selects a drawing for each attribute. The first selection module 130 thus may select the drawing systematically. A more specific example is described with respect to FIG. 7.

The first selection module 130 may store a combination of drawings, and then call the stored combination of drawings. This is referred to as presetting of search criteria. A more specific example is described with respect to FIG. 9.

In the drawings arranged on the trajectory, the first selection module 130 may make spacing between adjacent drawings displayed on the screen different from spacing between adjacent drawings not displayed on the screen, on the trajectory. A more specific example about this process is described with respect to FIG. 6.

The first selection module 130 may cause a size of the drawing displayed on the screen to depend on a number of the search words having the attributes attached thereto and indicated by the drawing. As the size of the drawing is larger, the number of search words associated with the drawing is higher. The user may estimate the number of search words by the size of the drawing.

In one of the trajectories at the four corners of the screen, the second selection module 140 may modify a partial match range of a search target character string or may switch clusters in a concept space. The second selection module 140 thus narrows or widens the search targets. The operation is referred to as the narrowing function. For example, if a day is selected as the time and date, the range may be widened to the month including that day. The designation of the narrowing function may be performed by an operation on the trajectory. More specifically, the operation is described below with respect to FIG. 10 through FIG. 15.

The search module 150 is connected to the search word memory module 110, the search word selection module 120, and the search result display module 160. The search module 150 performs the search operation using the search word or the attribute of the search word, selected by the search word selection module 120.

The search result display module 160 is connected to the search module 150. The search result display module 160 displays search results of the search module 150 on the screen of the information processing apparatus 100. This operation is described more specifically with respect to FIG. 2, and FIG. 18.

FIG. 2 illustrates a display example on a screen 200 in the embodiment.

The first selection module 130, the second selection module 140, and the search result display module 160 display, within the screen 200, a lens 210, a sub-lens 212, a sub-lens 214, a sub-lens 216, a range 220, and a search result display region 250. The sub-lens 212, the sub-lens 214, and the sub-lens 216 correspond to the drawings, and are displayed by the first selection module 130. In response to an operation of the user, the sub-lens 212, the sub-lens 214, and the sub-lens 216 move along the trajectory. If the trajectory is a quarter arc as illustrated in FIG. 2, the movement is rotation around a circle centered on the center of the lens 210.

The range 220 displayed by the second selection module 140 is a display that is used to modify a partial match range of a search target character string or to switch clusters in a concept space in response to the operation of the user. The search result display module 160 displays the inside of the search result display region 250, for examples, search results in a tile 252 or the like. The lens 210 indicates the attribute of the search word (time, location, human, thing, history, or the like), and the sub-lens 212 and other sub-lenses indicate search words with the attributes thereof attached thereto. For example, if the lens 210 indicates time, the sub-lens 212 indicates the day before yesterday, the sub-lens 214 indicates yesterday, and the sub-lens 216 indicates today. A combination of the lens 210, the sub-lens 212, and the like is not limited to the top left corner. The combination may be placed at one of the other three corners or at multiple corners of the four corners. The location of the range 220 is not limited to the bottom right corner. The location of the range 220 may be at one of the other three corners or at multiple corners of the four corners.

The user may perform the search operation as below, for example.

Step 1 The user operates on the sub-lens 212 or the like to perform the search operation at a coarse accuracy level.

Step 2 The user operates on the range 220, adjusting and narrowing a related search range.

Step 3 The user identifies the search target from the search results, such as the tile 252, displayed in the search result display region 250.

Figure 3:
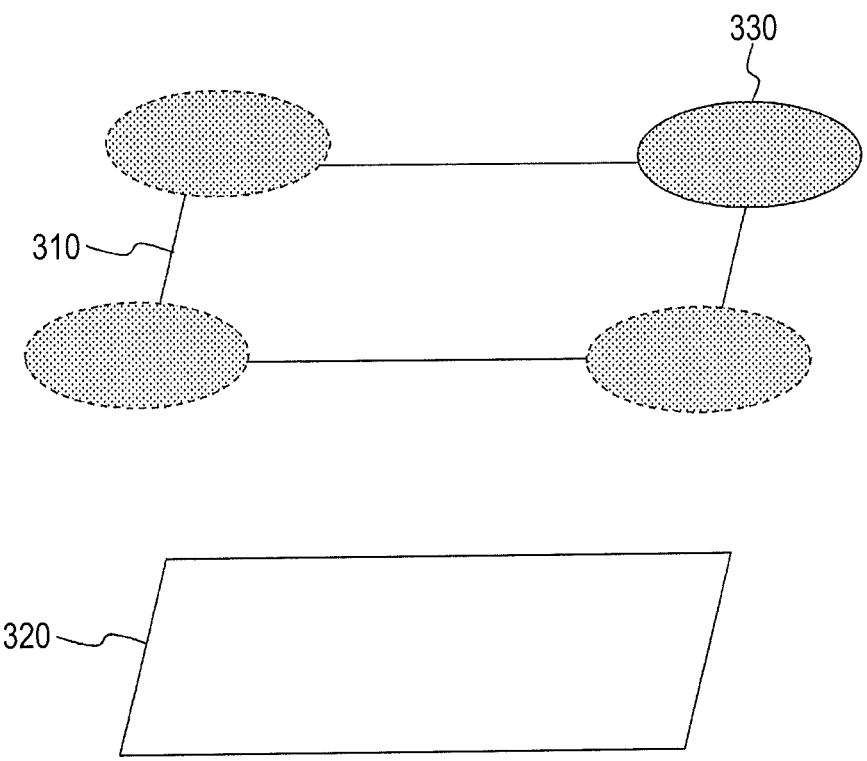
FIG. 3 illustrates a process example of layers in accordance with the embodiment.

FIG. 3 illustrates a process example of layers in accordance with the embodiment. The screen 200 of FIG. 2 includes two layers (operation layer (transparent) 310, and a display layer (collaged image) 320).

The search result display region 250 including the tile 252 or the like is displayed in the display layer (collaged image) 320 serving as a lower layer.

The lens 210, the sub-lens 212, the sub-lens 214, the sub-lens 216, and the range 220 are displayed on a function selection dial 330 or the like of the operation layer (transparent) 310 serving as an upper layer.

Referring to FIG. 3, the function selection dial 330 is located at the top right corner of the operation layer (transparent) 310. Alternatively, the function selection dial 330 may be located at another corner of the operation layer (transparent) 310 (at the bottom right corner, the bottom left corner, or the top left corner).

Figure 4:
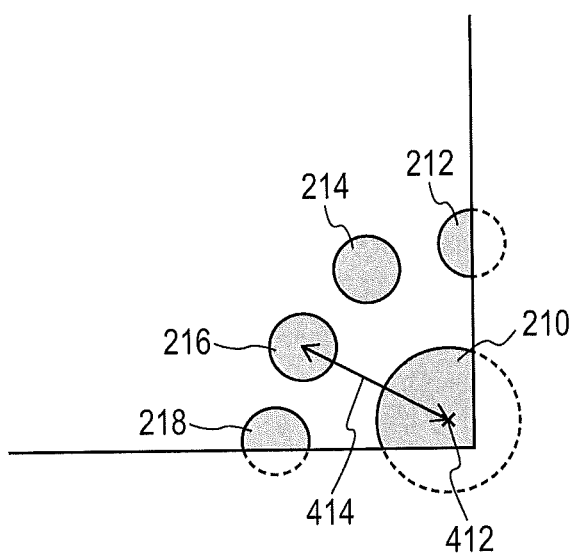
FIG. 4 illustrates a process example in accordance with the embodiment.

FIG. 4 illustrates a process example in accordance with the embodiment. The lens 210, the sub-lens 212, and the like may be displayed in a lens-like fashion. For example, the lens 210 may have transparency, or may be colored like ground glass, and may cause an object therebeneath to be displayed in enlargement.

The trajectory along which the sub-lens 212 or the like moves may be an arc centered on a center 412 of the lens 210 and having as a radius a distance 414 (a distance between the center 412 and the center of each drawing (the sub-lens 216, for example)). The center 412 may be at each of the corners of the screen or inside the screen.

Figure 5:
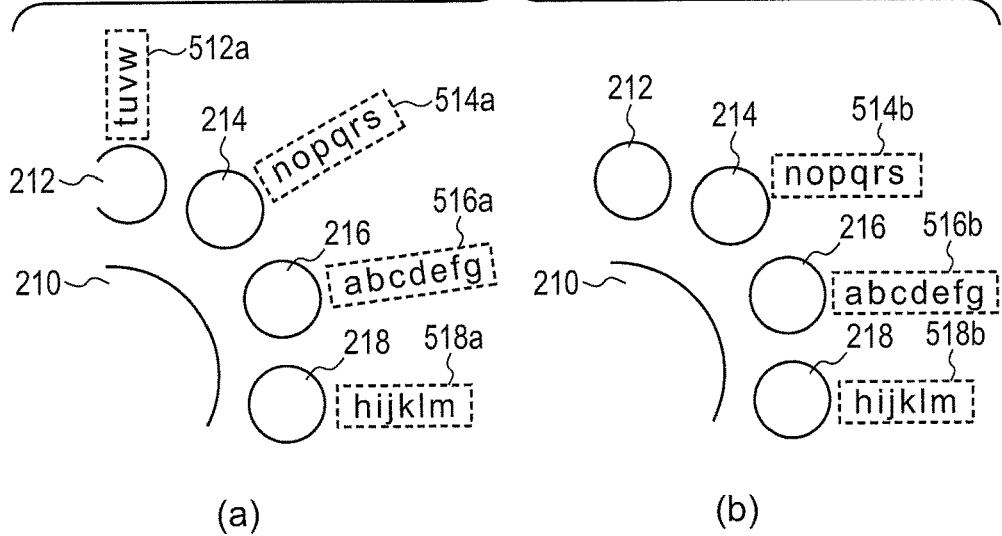
FIG. 5 illustrates a process example in accordance with the embodiment.

FIG. 5 illustrates a process example in accordance with the embodiment. FIG. 5 illustrates, in addition to the display of the sub-lens 212 and the like, a title display of a search word in text indicated by the sub-lens 212. In the example of (a) of FIG. 5, a title display region 512a and the like are radially displayed. The title display region 512a is located along a straight line originating at the center of the lens 210 and passing through the center of the sub-lens 212. In the example of (b) of FIG. 5, a title display region 514b and the like are located in parallel with the lower side of the screen 200. If the information processing apparatus 100 is implemented in a mobile apparatus, such as a tablet type terminal, the lower side of the screen 200 is not fixed, and one of the four sides of the screen 200 may become the lower side depending on the alignment of the terminal. A sensor or the like to detect a tilt of the information processing apparatus 100 is used to identify the lower side (bottom side).

The display regions may be displayed in a stationary state or during a slow rotation (when the information processing apparatus 100 moves at a predetermined speed or lower), and may not be displayed during a high-speed rotation (when the information processing apparatus 100 moves at a speed higher than the predetermined speed). In a stationary state, a title of a selected drawing may be displayed.

Characters displayed within the title display region 512a or the like may be, for example, white font with black outline.

Figure 6:
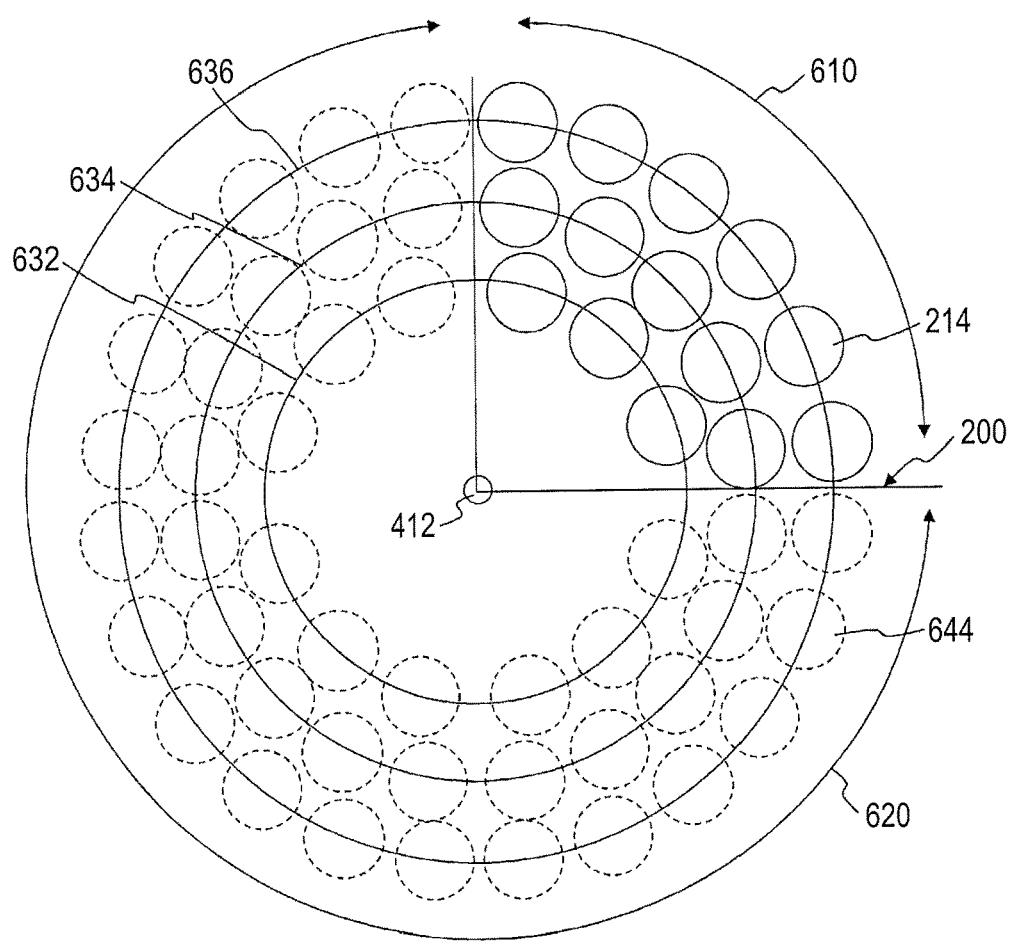
FIG. 6 illustrates a process example in accordance with the embodiment.

FIG. 6 illustrates a process example in accordance with the embodiment. The layer structure of the sub-lens 214 and the like is illustrated. The center 412 matches the center of the lens 210. The trajectory is divided into three layers. The drawing, such as the sub-lens 214, moves at each layer of the trajectory in response to an operation of the user. More specifically, the drawings may move independently on a per trajectory basis. The movement may be a right-turn rotation (clockwise rotation) or a left-turn rotation (counterclockwise rotation). A group of drawings belonging to a rendering region 610 is displayed, but a group of drawings belonging to a non-rendering region 620 is not displayed. However, a drawing that enters the rendering region 610 is displayed. The trajectory is associated with the attribute of the search word. For example, a trajectory 632 as an inner trajectory is associated with time, and drawings on that trajectory are associated with the day before yesterday, yesterday, today, and the like. A trajectory 634 as an external trajectory is associated with location, and drawings on that trajectory are associated with a living room, a conference room, a meeting room, company A, and the like. A trajectory 636 external to the trajectory 634 is associated with things, and drawings on that trajectory are associated with a job, a project, an event, and the like. Alternatively, each attribute has a layer structure, and trajectories may be associated with a higher layer, a middle layer, and a lower layer.

In the example of FIG. 6, the spacing between the adjacent drawings in the rendering region 610 is equal to the spacing between the adjacent drawings in the non-rendering region 620. In other words, all the drawings are located with equal spacings therebetween. The spacing between the adjacent drawings in the rendering region 610 may not necessarily have to be equal to the spacing between the adjacent drawings in the non-rendering region 620. For example, if the number of drawings is smaller than a predetermined value, the spacing between the adjacent drawings in the non-rendering region 620 may be set to be wider than the spacing between the adjacent drawings in the rendering region 610. On the other hand, if the number of drawings is larger than the predetermined value, the spacing between the adjacent drawings in the non-rendering region 620 may be set to be narrower than the spacing between the adjacent drawings in the rendering region 610 (the drawings may be mutually overlapped in some cases).

In the example of FIG. 6, the drawings are set to be equal in size, but the size of each drawing may be set to be dependent on the number of search words having the attributes indicated by the drawing. More specifically, the drawing may indicate the number of search results by the size of the drawing. In view of the easiness of selection, a maximum limit (minimum limit) may be set.

Figure 7:
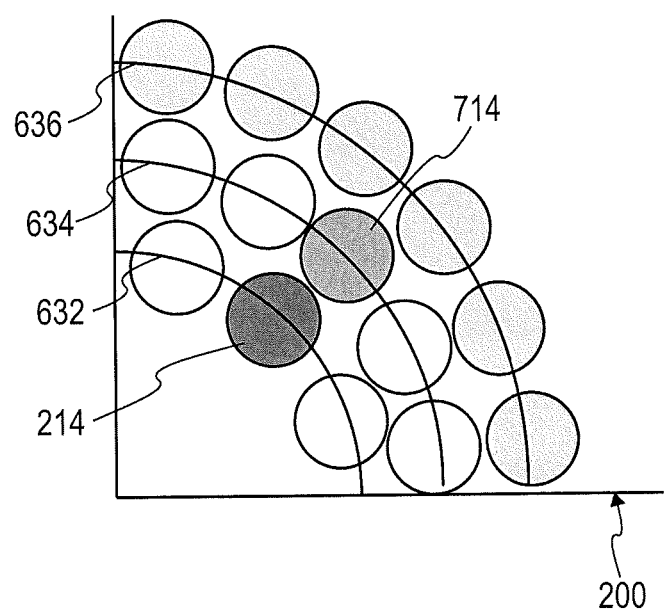
FIG. 7 illustrates a process example in accordance with the embodiment.

FIG. 7 illustrates a process example in accordance with the embodiment. There are three trajectories (a trajectory 632, a trajectory 634, and a trajectory 636). A selection of drawings (namely, a search word or an attribute of the search word) is determined on two trajectories (the trajectory 632 and the trajectory 634), and a selection of a drawing is under way on an external trajectory (the trajectory 636). In other words, the drawings, such as the sub-lens 214, remain stationary on the trajectory 632 and the trajectory 634 while the drawings are moving on the trajectory 636. The drawings selected herein are drawings at an upper right tilt of 45 degrees from the bottom right portion of the screen 200 (a sub-lens 214 and a sub-lens 714 in the example of FIG. 7). A combination of multiple drawings represents a combination of search words or a combination of attributes of the search words. The combination refers to a search expression (logical equation) using OR, AND or the like.

Three drawings, such as the sub-lens 214, are rendered on the trajectory 632. If the sub-lens 214 is selected from the drawings on the trajectory 632, items related to the sub-lens 214 are extracted, five drawings, such as the sub-lens 714 and the like, are rendered on the trajectory 634 to indicate the extracted items. The items related to the sub-lens 214 are intended to mean a search word or the like under the search word or the attribute of the search word indicated by the sub-lens 214. If the sub-lens 714 is selected from the drawings on the trajectory 634, items related to the sub-lens 714 are extracted, and six drawings related to the sub-lens 714 are rendered on the trajectory 636.

As illustrated in FIG. 7, the drawing already selected is displayed in a form different from the other unselected drawings (for example, displayed in a color denser than the color of the unselected drawing). The drawings on the trajectory serving as an operation target of the user (a moving drawing, and a drawing on an unselected trajectory) are displayed in a form different from the drawing on the selected trajectory (for example, displayed in a color lighter).

In this example herein, the drawings are selected in the order from an internal trajectory to an external trajectory, and after the selection is determined, the next external trajectory is displayed. Conversely, the drawings are selected and displayed in the order from an external trajectory.

Figure 8:
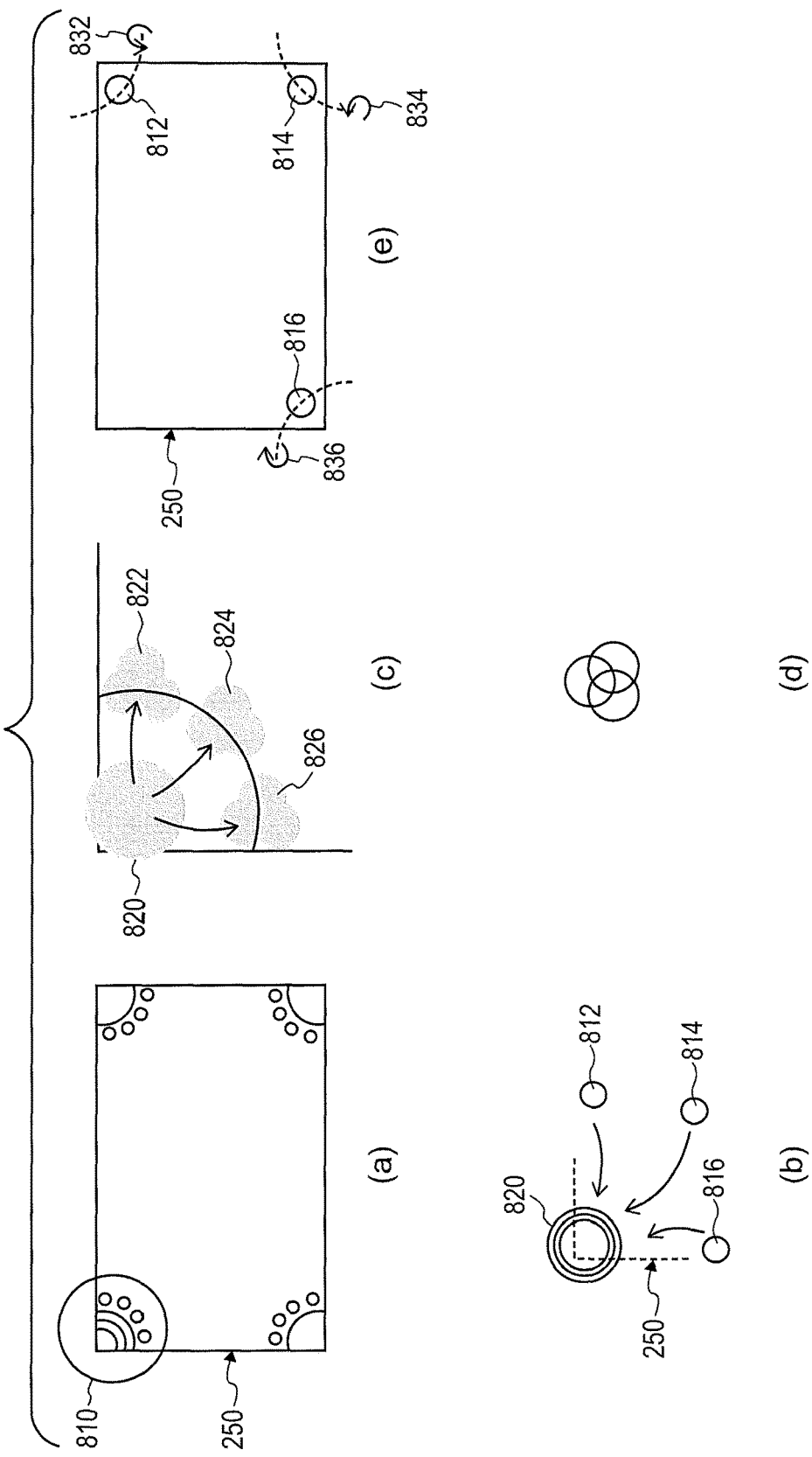
FIG. 8 illustrates a process example in accordance with the embodiment.

FIG. 8 illustrates a process example in accordance with the embodiment. A preset operation corresponding to storage of the created search expression is described.

A preset lens display region 810 illustrated in (a) of FIG. 8 indicates that there is a combination of drawings preset in this region (preset lenses). The preset lens is displayed at the top left corner as a predetermined location, but another location may be selected in response to an operation of the user.

A lens shape rendered by multiple lines is displayed as the preset lens 820. Three lines are drawn herein, and indicate that three narrowing conditions are stored.

The preset lens 820 illustrated in (b) of FIG. 8 indicates a combination of a sub-lens 812, a sub-lens 814, and a sub-lens 816. More specifically, the preset lens 820 indicates an image of three overlapping lenses by three concentric circles. Preset in this example in a presetting operation (storage of a combination of the drawings) are the sub-lens 812 at the top right corner, the sub-lens 814 at the bottom right corner, and the sub-lens 816 at the bottom left corner.

The calling operation of the preset is described below with respect to (c), (d), and (e) of FIG. 8.

(1) The preset lens 820 is selected (tapped) by the operation of the user.

(2) Three presets stored on the preset lens 820 are expanded, and displayed as a preset sub-lens group 822, a preset sub-lens group 824, and a preset sub-lens group 826. For example, the preset sub-lens group 824 is a drawing of three lenses (the sub-lens 812, the sub-lens 814, and the sub-lens 816) that partially overlap each other as illustrated in (d) of FIG. 8.

(3) When one of the present sub-lens groups is selected (tapped) by an operation of the user, the drawings at the remaining three corners move as illustrated in (e) of FIG. 8 to indicate that the presetting is reflected. More specifically, the drawing at the top right corner moves in a rotation direction 832 along the trajectory to display the sub-lens 812, the drawing at the bottom right corner moves in a rotation direction 834 along the trajectory to display the sub-lens 814, and the drawing at the bottom left corner moves in a rotation direction 836 along the trajectory to display the sub-lens 816.

The search operation is performed in accordance with the set search expression, and search results are displayed in the search result display region 250.

Figure 9:
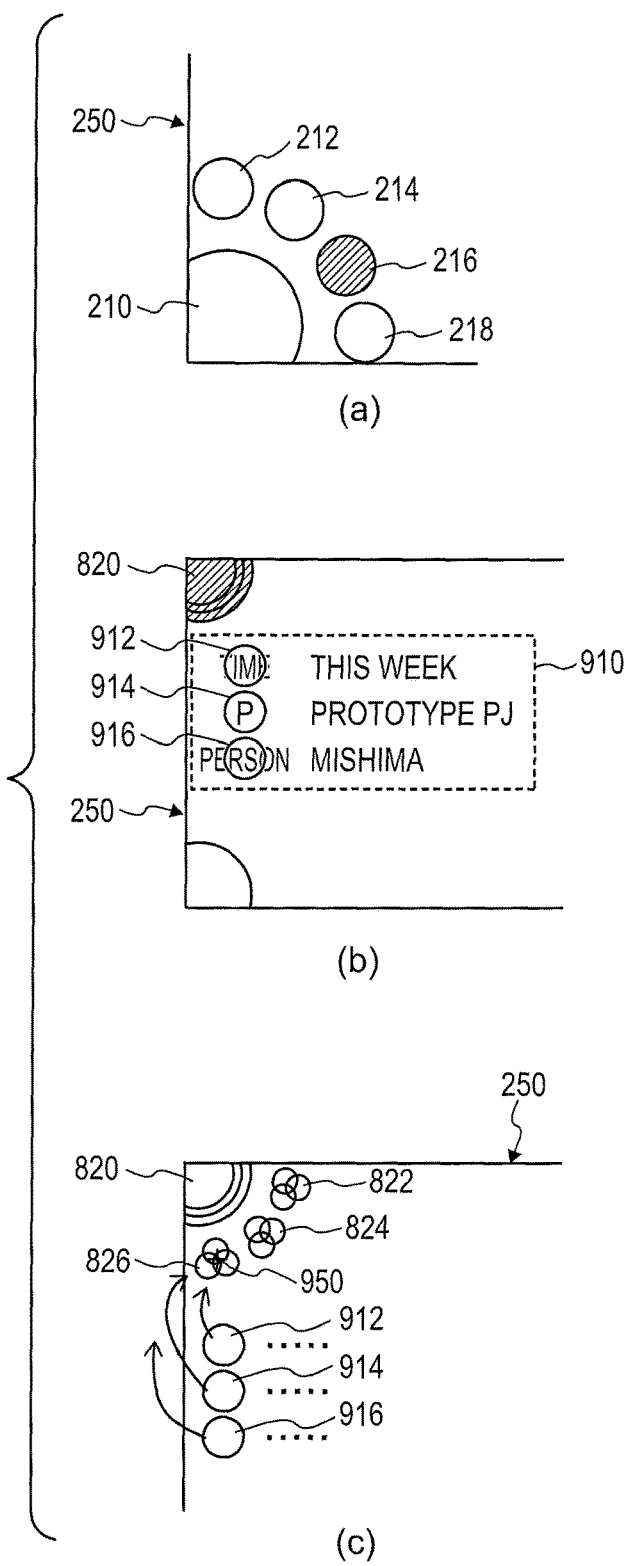
FIG. 9 illustrates a process example in accordance with the embodiment.

FIG. 9 illustrates a process example in accordance with the embodiment. Verification display (feedback) of the selected drawing and storage of the preset are described below.

(a) of FIG. 9 illustrates an example in which the preset is displayed with the forms of the drawings at the corners displayed to be different from each other (ON/OFF display) as illustrated in (e) of FIG. 8. In addition to this method, a list of selected drawings is displayed.

Preset contents may be displayed below the preset lens 820 as illustrated in (b) of FIG. 9. For example, a preset condition display region 910 indicates that this week is set as an attribute of time and date 912, that a prototype PJ is set as an attribute of project 914, and that MISHIMA is set as an attribute of person 916. The preset condition display region 910 displays the attributes in the order of selection from top to bottom. A title display is also displayed. The preset condition display region 910 may be displayed when the preset lens 820 is selected. The preset condition display region 910 is not displayed before the preset lens 820 is selected.

The storage of the preset may be performed as illustrated in (c) of FIG. 9 as below.

(1) When the preset lens 820 is selected, the preset in the preset lens 820 is expanded (the preset sub-lens group 822, the preset sub-lens group 824, and the preset sub-lens group 826 are displayed), and the drawings currently selected at the other locations (the top right corner, the bottom right corner, and the bottom left corner) are displayed as the time and date 912, the project 914, and the person 916.

(2) A preset sub-lens group that permits a preset to be added (including an empty preset sub-lens) thereto is extracted from among the preset sub-group lenses. A plus icon 950 is added to the extracted preset sub-lens group. If the preset sub-lens group 826 with the plus icon 950 added thereto is selected, animation is performed to collect the time and date 912, the project 914, and the person 916 in the preset sub-lens group 826. The search criteria of the time and date 912, the project 914, and the person 916 is added to the preset sub-lens group 826.

Figures 10, 11:
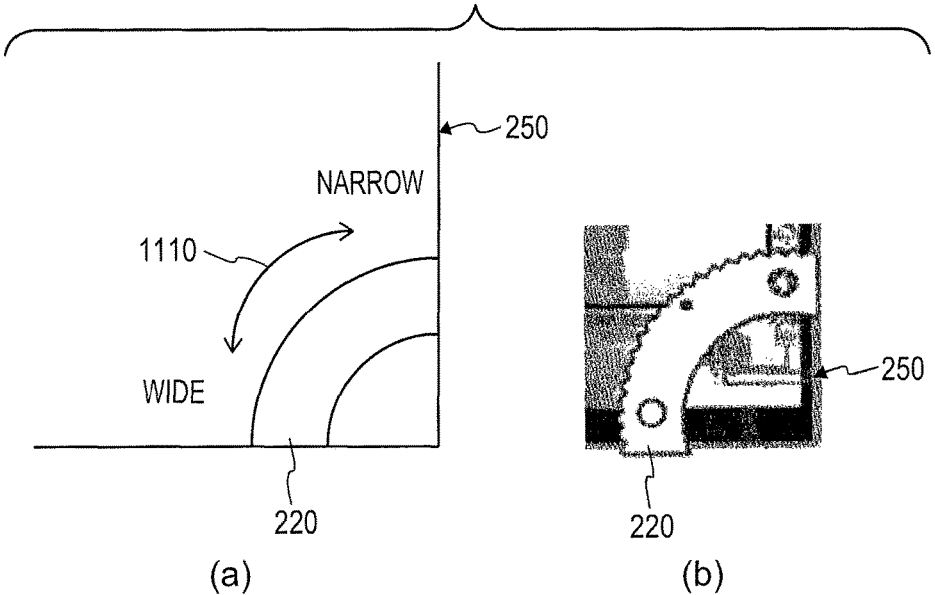
FIG. 10 illustrates an example of data structure of a range table in accordance with the embodiment.
FIG. 11 illustrates a process example in accordance with the embodiment.

FIG. 10 illustrates an example of data structure of a range table 1000 in accordance with the embodiment. A range narrowing function is described, which is related to switching a partial match range of a search target character string or clusters in a concept space.

The range table 1000 includes a target attribute column 1010, and a range column 1020. The range column 1020 includes a wide range column 1022, and a narrow range column 1024. The target attribute column 1010 stores a target attribute. The range column 1020 stores a range. The wide range column 1022 stores a process in a wide range (enlargement of the search targets). The narrow range column 1024 stores a process in a narrow range (reduction of the search targets).

FIG. 11 illustrates a process example in accordance with the embodiment. As illustrated in FIG. 11(*b*), the range 220 is displayed in a corner of the search result display region 250. Whether to use the wide range column 1022 or the narrow range column 1024 as a range is determined in response to an operation of the user on the range 220. For example, as illustrated in FIG. 11(*a*), if an upper portion of the range 220 in a range direction 1110 is selected by the operation of the user, the search is performed in a range stored in the narrow range column 1024, and if a lower portion of the range 220 in the range direction 1110 is selected by the operation of the user, the search is performed in a range stored in the wide range column 1022.

FIG. 12 illustrates an example of an ontology graph serving as a process target in accordance with the embodiment. In the case described below, the range is set in a one-dimensional value, such as wide/narrow, or open/closed (a link intensity in this case herein).

Note that the ontology graph expresses in terms of distance a relationship between a search word and an attribute of the search word. The distance herein refers to a distance between search words at locations (coordinates) in a concept space. For example, a project 1210 as an attribute has search words P1: 1211, P2: 1212, and P3: 1213, and person 1250 as an attribute has search words M1: 1251, M2: 1252, and M3: 1253, and key result 1260. Each link has an identifier uniquely identifying that link in the embodiment (Lin in FIG. 12). Distances to the key result 1260 are related as Li1<Li4<Li6<Li2<Li5<Li3.

A project-person-range table 1300 of FIG. 13 is created from the relationship. The project-person-range table 1300 includes a project column 1310, a person column 1320, and a project+person column 1330. The project column 1310 stores search results of a project as an attribute. The person column 1320 stores search results of a person as an attribute. The project+person column 1330 stores search results of a combination of project and person as attributes. More specifically, if the attribute as a search target is a project, P1: 1211 closest to the key result 1260 is displayed as the search result. If the range is widened, P1: 1211 and P2:1212 are displayed as the search results. If the range is further widened, P1: 1211, P2: 1212 and P3: 1213 are displayed as the search results. Similarly, the attribute as the search target may be person. M1: 1251 closest to the key result 1260 is displayed as the search result with the ranged narrowed. M1:1251 and M3:1253 are displayed as the search results with the range widened. M1:1251, M3:1253, and M2:1252 are displayed as the search results with the range further widened. The attribute as the search target may be a combination of project and person. P1: 1211 closest to the key result 1260 is displayed as the search result with the range narrowed. P1: 1211 and M1: 1251 are displayed as the search results with the range widened. P1: 1211, M1: 1251, and M3: 1253 are displayed as the search results with the range further widened. P1: 1211, M1: 1251, M3: 1253, and P2: 1212 are displayed as the search results with the range even further widened. P1: 1211, M1: 1251, M3: 1253, P2: 1212, and M2: 1252 are displayed as the search results with the range even further widened. P1: 1211, M1: 1251, M3: 1253, P2: 1212, M2: 1252, and P3: 1213 are displayed as the search results with the range even further widened.

Figure 15:
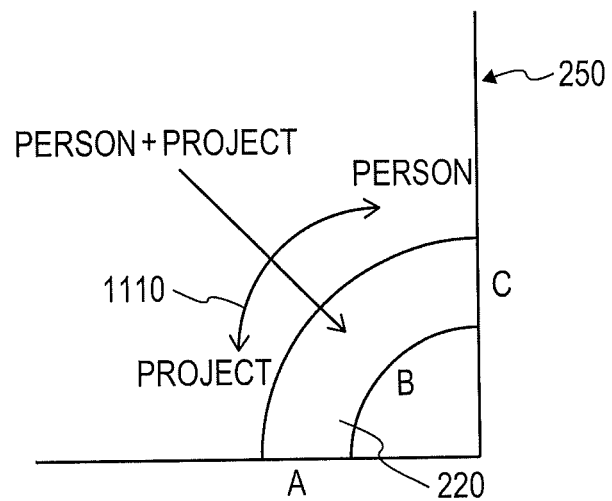
FIG. 15 illustrates a process example in accordance with the embodiment.

FIG. 14 illustrates an example of data structure of a person-project range table 1400. In this example, the values of two (two-dimensional) parameters are varied in the range. FIG. 15 illustrates the example of a range 220 that is displayed with a combination of person and project as attributes set to be a search target. The location of the range C indicates that the narrowing operation is performed to an attribute of a higher percentage of person (an attribute of project is excluded as a result), and the location of the range A indicates that the narrowing operation is performed to an attribute of a higher percentage of project (an attribute of person is excluded as a result), and the location of the range B indicates that the narrowing operation is performed with the attribute of person at a fifty percent and the attribute of project at a fifty percent.

A person-project range table 1400 includes an attribute column 1410, a person column 1420, a person 75-percent and project 25-percent column 1430, a center column 1440, a person 25-percent and project 75-percent column 1450, and a project column 1460. The attribute column 1410 stores attributes. Each of the person column 1420 through the project column 1460 store percentages of person and project as attributes. For example, the person column 1420 indicates percentages of the attributes at the location of the range C of FIG. 15. Search results of only the person attribute are searched and displayed. The center column 1440 indicates percentages of the attributes at the location of the range B of FIG. 15, and search results with the attributes of the 50 percent person and the attributes of the 50 percent project are searched and displayed. The project column 1460 indicates percentages of the attributes at the location of the range A of FIG. 15, and only search results of the attributes of the project are searched and displayed.

Figure 16:
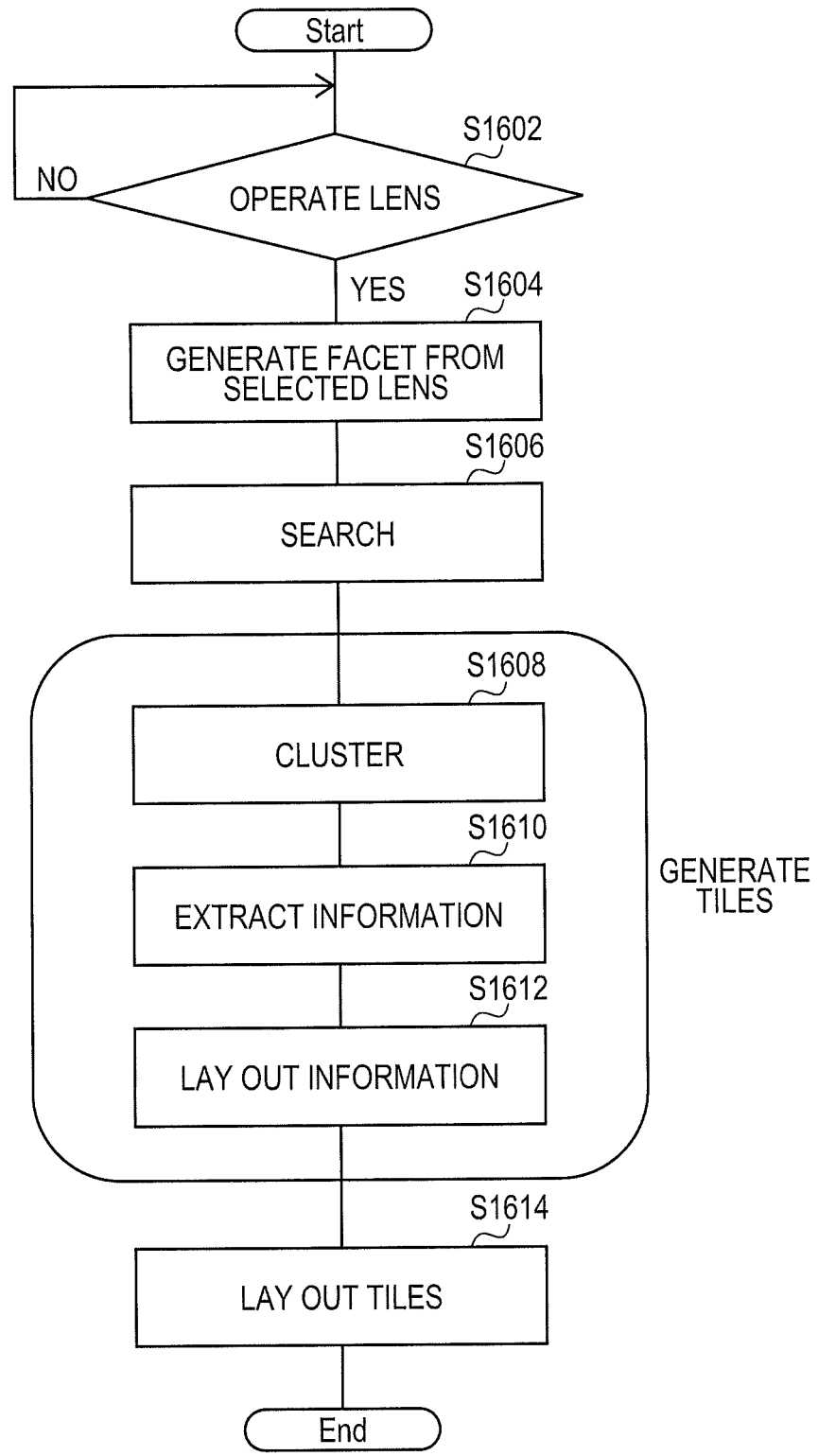
FIG. 16 is a flowchart illustrating a process example in accordance with the embodiment.

FIG. 16 is a flowchart illustrating a process example in accordance with the embodiment.

In step S1602, the information processing apparatus 100 determines whether a lens operation is to be performed. If the information processing apparatus 100 determines that the lens operation is to be performed, processing proceeds to step S1604. Otherwise, the information processing apparatus 100 waits on standby until the lens operation is to be performed. The lens operation corresponds to the operation related to the drawing described above.

In step S1604, the information processing apparatus 100 generates a facet (search expression) from the selected lens.

In step S1606, the information processing apparatus 100 performs a search according to the facet generated in step S1604.

In step S1608, the information processing apparatus 100 clusters the search results. Through the process from step S1608 to step S1612, tiles indicating the search results are generated.

In step S1610, information as the search results is extracted from each class (as a result of the clustering). For example, a document as a result of the searching is extracted from a document DB or the like.

In step S1612, the information as the search results is laid out. A single search result corresponds to a tile.

In step S1614, the tiles are laid out. More specifically, the tiles are displayed so that the tiles indicating the search results are spread all over the screen.

A process example of generating the tiles in accordance with the embodiment is described below. As described below, the search results are displayed as the tiles.

Figure 18:
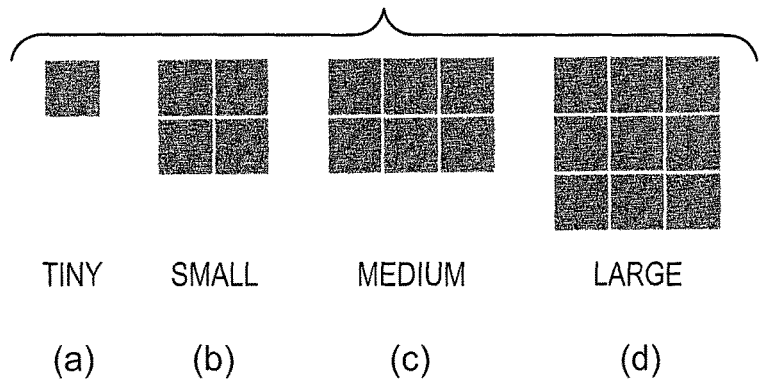
FIG. 18 illustrates a process example in accordance with the embodiment.

(1) Thumbnail views (reduced images) of the document acquired as a result of searching are clustered at four tile size levels as illustrated in FIG. 18. For example, the thumbnail images may be clustered according to an amount of information included in the document acquired as a result of searching, the number of search words, and the number of days from registered date.

(2) The vertical length and horizontal length of each tile are determined depending on the direction of writing of the document (horizontal writing or vertical writing).

(3) The direction of scroll is only a single axis direction (with the default direction is X direction).

(4) A minimum tile (1×1) and small tiles (2×2) illustrated in FIG. 18(*a*) and FIG. 18(*b*) may be displayed using the whole thumbnail image of the document, and medium tiles (2×3), and large tiles (3×3) illustrated in FIG. 18(*c*) and FIG. 18(*d*) may be displayed using partial thumbnail images of the document. In other words, the size of each tile may indicate whether the reduced image of the search results is a whole image or a partial image of the document.

(5) A font size of a title of each tile may be fixed.

(6) When the registration date of the search results is changed, the tile size may be determined so that the tile is segmented at that date. More specifically, the search results may be sorted and displayed according to the registration data (any information is acceptable as long as it indicates the date), the date may be represented by a Y axis. At the point where the date changes, the tile may be adjusted in size so that the tile is segmented at that location, and resulting tiles are spread over the screen.

Figure 19:
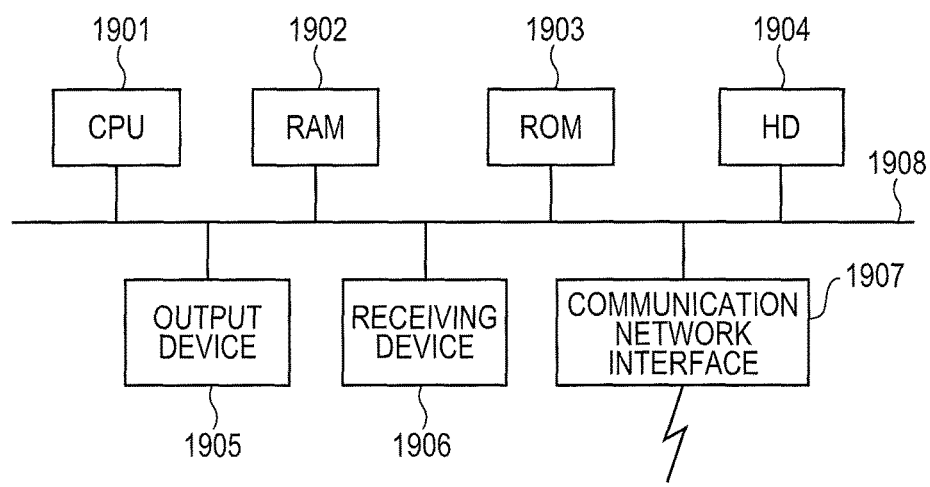
FIG. 19 is a block diagram illustrating a hardware configuration example of a computer implementing the embodiment.

A computer hardware configuration of a computer on which programs of the embodiment run is a standard computer as illustrated in FIG. 19. Specifically, the computer hardware configuration is a computer that may serve as a personal computer or a server. More specifically, a CPU 1901 is used as a processor (arithmetic processor), and a RAM 1902, a ROM 1903, and an HD 1904 are used as storage devices. A hard disk may be used for the HD 1904.

The computer includes the CPU 1901 that executes programs of the search word selection module 120, the first selection module 130, the second selection module 140, the search module 150, and the search result display module 160. The computer further includes the RAM 1902 that stores the programs and data, the ROM 1903 that stores a program to start up the computer and other programs, the HD 1904 that is an auxiliary storage device (a flash memory may be acceptable), a receiving device 1906 that receives data responsive to an operation that a user performs on a keyboard, a mouse, a touchpanel, and the like, an output device 1905 such as a liquid-crystal display, a communication network interface 1907, such as a network interface card, for connection with a communication network, and a bus 1908 that interconnects these elements to exchange data thereamong. Multiple computers of this type may be interconnected to each other via a network.

A computer program of the embodiment may be read as software onto the system of the hardware configuration, and the embodiment is thus implemented with the software and hardware resources operating in cooperation.

The hardware configuration of FIG. 19 is discussed for exemplary purposes only. The embodiment is not limited to this hardware configuration of FIG. 19 and may be acceptable in any form as long as the modules of the embodiment are implemented. For example, some modules may be implemented using dedicated hardware (such as ASIC). In another example, some modules may be in an external system and connected to the system of FIG. 19 via a communication network. In yet another example, plural systems of FIG. 19 may be interconnected to each other via a communication line such that the systems operate in cooperation with each other. One of the modules may be incorporated not only in a personal computer, but also in a network home appliance, a copying machine, a facsimile device, a scanner, a printer, a multi-function apparatus (an image processing apparatus having at least two of the functions of the scanner, the printer, the copying machine, and the facsimile device).

The above-described program may be supplied in a stored state on a recording medium. The program may also be provided via communications. In such a case, the above-described program may be understood as an invention of a "non-transitory computer readable recording medium storing the program".

The "non-transitory computer readable recording medium storing the program" refers to a computer readable recording medium storing the program, and is used to install the program, to execute the program, or to distribute the program.

The recording media include digital versatile disc (DVD), compact disc (CD), Blu-ray disc (registered trademark), magnetooptical disc (MO), flexible disc (FD), magnetic tape, hard disc, read-only memory (ROM), electronically erasable and programmable read-only memory (EEPROM (registered trademark)), flash memory, random-access memory (RAM), and secure digital (SD) memory card. The DVDs include "DVD-R, DVD-RW, and DVD-RAM" complying with the standard formulated by the DVD forum, and "DVD+R and DVD+RW" complying with DVD+RW standards. The CDs include read-only CD (CD-ROM), recordable CD-R, and rewritable CD-RW.

The program in whole or in part may be stored on the recording medium for storage and distribution. The program in whole or in part may be transmitted via a transfer medium. The transfer media include a wired network, a wireless network, or a combination thereof. The wired and wireless networks may include a local-area network (LAN), a metropolitan-area network (MAN), a wide-area network (WAN), the Internet, an intranet, and an extranet. The program in whole or in part may be transmitted over a carrier wave.

The program may be part of another program, or may be stored on the recording medium together with another program. The program may be split and split programs may then be separately stored on the recording media. The program may be processed in any fashion before being stored as long as the program remains restorable. For example, the program may be compressed or encrypted before storage.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one processor configured to function as:
a first selection unit that displays drawings each indicating a search word or an attribute of the search word on a plurality of trajectories that are concentric circles different in diameter at a corner of four corners of a touch screen in a selectable state, moves one of the drawings along the trajectories in response to an operation of a user on the touch screen, and selects one of the drawings for each trajectory to select the search word with the attribute attached thereto or the attribute of the search word;
a second selection unit that, in response to an operation of a user on the touch screen, refines an operation of modifying a partial match range of a search target character in the search word or attribute of the search word selected by the first selection unit or switches clusters in a concept space in the search word or the attribute of the search word selected by the first selection unit by adjusting a numeric range or proportion factor; and
a search unit that performs a search using the search word or the attribute of the search word that is selected by the first selection unit and the refinement selected by the second selection unit,
a display unit configured to display the results of the performed search,
wherein the first selection unit displays the plurality of trajectories, with attributes each associated with a trajectory,
wherein the second selection unit modifies the partial match range of the search target character or switches clusters in the concept space on a trajectory at one corner of the four corners except for the corner used by the first selection unit.

2. An information processing apparatus according to claim 1, wherein the first selection unit combines a plurality of drawings arranged on the plurality of trajectories to select a plurality of search words or a plurality of attributes of the plurality of search words.

3. The information processing apparatus according to claim 2,
wherein a shape of a drawing serving as a target of an operation of the user from among the plurality of drawings arranged on the plurality of trajectories is displayed in a different form from a shape of another drawing from among the plurality of drawings arranged on the plurality of trajectories.

4. The information processing apparatus according to claim 2,
wherein the first selection unit displays a plurality of trajectories each of which an attribute is associated with and the drawing is arranged on.

5. The information processing apparatus according to claim 2,
wherein the first selection unit stores a combination of the drawings and calls the stored combination of the drawings.

6. The information processing apparatus according to claim 1,
wherein spacing between adjacent drawings that are arranged on the trajectory and are displayed on the screen is different from spacing between adjacent drawings that are arranged on the trajectory and are not displayed on the screen.

7. The information processing apparatus according to claim 1,
wherein a size of the drawing displayed on the screen depends on a number of the search words with the attributes attached thereto and indicated by the drawing.

8. A non-transitory computer readable medium storing an information processing program causing a computer to operate as:

a first selection unit that displays drawings each indicating a search word or an attribute of the search word on a plurality of trajectories that are concentric circles different in diameter at one corner of four corners of a touch screen in a selectable state, moves one of the drawings along the trajectories in response to an operation of a user on the touch screen, and selects one drawing for each trajectory to select the search word with the attributes attached thereto or the attributes of the search word;

a second selection unit that, in response to an operation of a user on the touch screen, refines an operation of modifying a partial match range of a search target character in the search word or attribute of the search word selected by the first selection unit or switches clusters in a concept space in the search word or the attribute of the search word selected by the first selection unit; and a search unit that performs a search using the search word or the attribute of the search word that is selected by the first selection unit and the refinement selected by the second selection unit, a display unit configured to display the results of the performed search, wherein the first selection unit displays the plurality of trajectories, with attributes associated with each trajectory, wherein the second selection unit modifies the partial match range of the search target character or switches clusters in the concept space on at trajectory at one corner of the four corners except for the corner used by the first selection unit.

* * * * *